(12) United States Patent
Ichimaru

(10) Patent No.: US 7,371,060 B2
(45) Date of Patent: May 13, 2008

(54) MOLD-ATTACHING/DETACHING DEVICE IN TIRE-VULCANIZING MACHINE

(75) Inventor: Hironobu Ichimaru, Chikugo (JP)

(73) Assignee: Ichimaru Giken Co., Ltd., Chikugo-shi (JP)

( * ) Notice: Subject to any disclaimer, the term of this patent is extended or adjusted under 35 U.S.C. 154(b) by 221 days.

(21) Appl. No.: 10/554,465

(22) PCT Filed: Apr. 26, 2004

(86) PCT No.: PCT/JP2004/006040

§ 371 (c)(1),
(2), (4) Date: Mar. 28, 2006

(87) PCT Pub. No.: WO2004/101250

PCT Pub. Date: Nov. 25, 2004

(65) Prior Publication Data

US 2007/0009624 A1    Jan. 11, 2007

(30) Foreign Application Priority Data

Apr. 25, 2003 (JP) ............................. 2003-121408

(51) Int. Cl.
*B29C 35/02* (2006.01)
(52) U.S. Cl. ........................... 425/46; 425/47; 425/195
(58) Field of Classification Search .................. 425/46, 425/47, 195
See application file for complete search history.

(56) References Cited

U.S. PATENT DOCUMENTS 5,589,200 A * 12/1996 Irie .............................. 425/46
5,820,886 A * 10/1998 Irie .............................. 425/47

6,292,993 B1    9/2001 Ito et al.

FOREIGN PATENT DOCUMENTS

EP     0955 153 A2    11/1999

(Continued)

OTHER PUBLICATIONS

Japanese Patent Office Search Report dated Sep. 28, 2004 (4 pages).

*Primary Examiner*—James P. Mackey
(74) *Attorney, Agent, or Firm*—Flynn, Thiel, Boutell & Tanis, P.C.

(57) ABSTRACT

Disclosed is a mold attaching/detaching apparatus in a tire vulcanizer, having locking/unlocking means configured so as to perform an engagement and disengagement by utilizing the relative movement between a top plate and bottom plate of the tire vulcanizer in a horizontal direction, and capable of being inexpensively constructed by simplifying the structure and operation of the locking/unlocking means. In the tire vulcanizer configured so that a segmental mold 3 is held between the top plate 1 and the bottom plate 2 to perform vulcanization, and opened and closed while expanding and contracting the segments by raising and lowering the top plate and operating an expansion/contraction device 4, in an engaged state of the locking/unlocking means 50 and 61, the locking/unlocking means is engaged in a state where the center of the top plate and the center of the bottom plate coincide with each other at a vulcanizing position M by the relative movement between the top plate and the bottom plate in the horizontal direction, and is disengaged at an offset position N shifted from the vulcanizing position in the horizontal direction.

1 Claim, 6 Drawing Sheets

FOREIGN PATENT DOCUMENTS

| | | |
|---|---|---|
| JP | 56-118019 U | 9/1981 |
| JP | 1-178919 U | 12/1989 |
| JP | 3-81715 U | 8/1991 |
| JP | 6-29815 U | 4/1994 |
| JP | 2000-825 A | 1/2000 |

* cited by examiner

MOLD-ATTACHING/DETACHING DEVICE IN TIRE-VULCANIZING MACHINE

TECHNICAL FIELD

The present invention relates to a mold attaching/detaching apparatus in a tire vulcanizer.

BACKGROUND ART

With the trend of tire width toward smaller size, the main stream of a mold in a tire vulcanizer is shifting from a two-piece mold that is vertically divided into two pieces, to a segmental mold.

This segmental mold includes an upper container plate, a lower container plate, and a plurality of divided segments expanding and contracting in radial directions.

An expansion/contraction device for expanding and contracting the segments of the segmental mold is provided to a top plate. These segments are adapted to expand and contract due to an expanding/contracting operation of the expansion/contraction device and the inner structure of the segmental mold.

The mold in a tire vulcanizer needs to be replaced in accordance with the size of a tire to be produced. For this purpose, locking/unlocking means is provided between the expansion/contraction device and the upper container plate of the segmental mold.

As locking/unlocking means provided between the expansion/contraction device and the upper container plate of the segmental mold, for example, locking/unlocking means using a bayonet mechanism as disclosed in Japanese Examined Patent Application Publication No. 5-62046, has hitherto been known.

The locking/unlocking means using this bayonet mechanism includes a bayonet lock provided to the upper container plate and a bayonet claw provided to the expansion/contraction device, and has a configuration in which the bayonet claw is engaged with and disengaged from the bayonet lock.

However, as before, the locking/unlocking means using the bayonet mechanism needs to rotate its bayonet claw provided to the expansion/contraction device to engage with and disengage from the bayonet lock.

Originally, the function of the expansion/contraction device is to expand and contract the segments of the segmental mold by expanding/contracting operations thereof, and hence, the expansion/contraction device has only to have a structure allowing expanding/contracting operations. However, the conventional locking/unlocking means is required to incorporate a rotational mechanism for rotating the bayonet claw into the expansion/contraction device.

In the arrangement incorporating the locking/unlocking means into the expansion/contraction device thereof as described above, a problem has occurred in that the structure thereof becomes complicated correspondingly, as well as the locking/unlocking operation also becomes complicated since the locking/unlocking entails a rotational operation.

The present invention has been made for solving the above-described conventional problem. The object of the present invention is to provide a mold attaching/detaching apparatus in a tire vulcanizer, having locking/unlocking means configured to perform an engagement and disengagement by utilizing a relative movement between the top plate and bottom plate of the tire vulcanizer in a horizontal direction, and thereby capable of being inexpensively constructed by simplifying the structure and operation of the locking/unlocking means.

DISCLOSURE OF INVENTION

To solve the above-described problems, the present invention provides a mold attaching/detaching apparatus (claim 1) in a tire vulcanizer. Herein, the tire vulcanizer includes a top plate and a bottom plate relatively moving in a horizontal direction, and relatively moving in a vertical direction at a vulcanizing position; a segmental mold that includes an upper container plate, a lower container plate, and a plurality of divided segments expanding and contracting in radial directions, and that is replaceably placed on the bottom plate; an expansion/contraction device mounted to the top plate, and expanding and contracting the segments of the segmental mold; a locking/unlocking means provided between the expansion/contraction device and the upper container plate; and the segmental mold being held between the top plate and the bottom plate to perform vulcanization at the vulcanizing position, and opened and closed while expanding and contracting the segments by raising and lowering the top plate and operating an expansion/contraction device, in an engaged state of the locking/unlocking means. Herein, the locking/unlocking means includes a locking piece provided in the expansion/contraction device, and a receiving piece provided to the upper container plate of the segmental mold. The locking/unlocking means is configured so that the locking piece horizontally moves to below the receiving piece and is engaged with the receiving piece when the expansion/contraction device mounted to the top plate and the segmental mold placed on the bottom plate move to the vulcanizing position where the center of the expansion/contraction device and the center of the segmental mold coincide with each other by a relative movement between the expansion/contraction device mounted to the top plate and the segmental mold placed on the bottom plate in the horizontal direction, and so that the locking piece horizontally moves from below the receiving piece and is disengaged from the receiving piece when the expansion/contraction device or the segmental mold moves to an offset position shifted from the vulcanizing position in the horizontal direction.

DETAILED DESCRIPTION OF THE INVENTION

Hereinafter, an embodiment according to the present invention will be described with respect to the drawings. The specific construction of the present invention is not limited by the embodiment described below.

Figure 1:
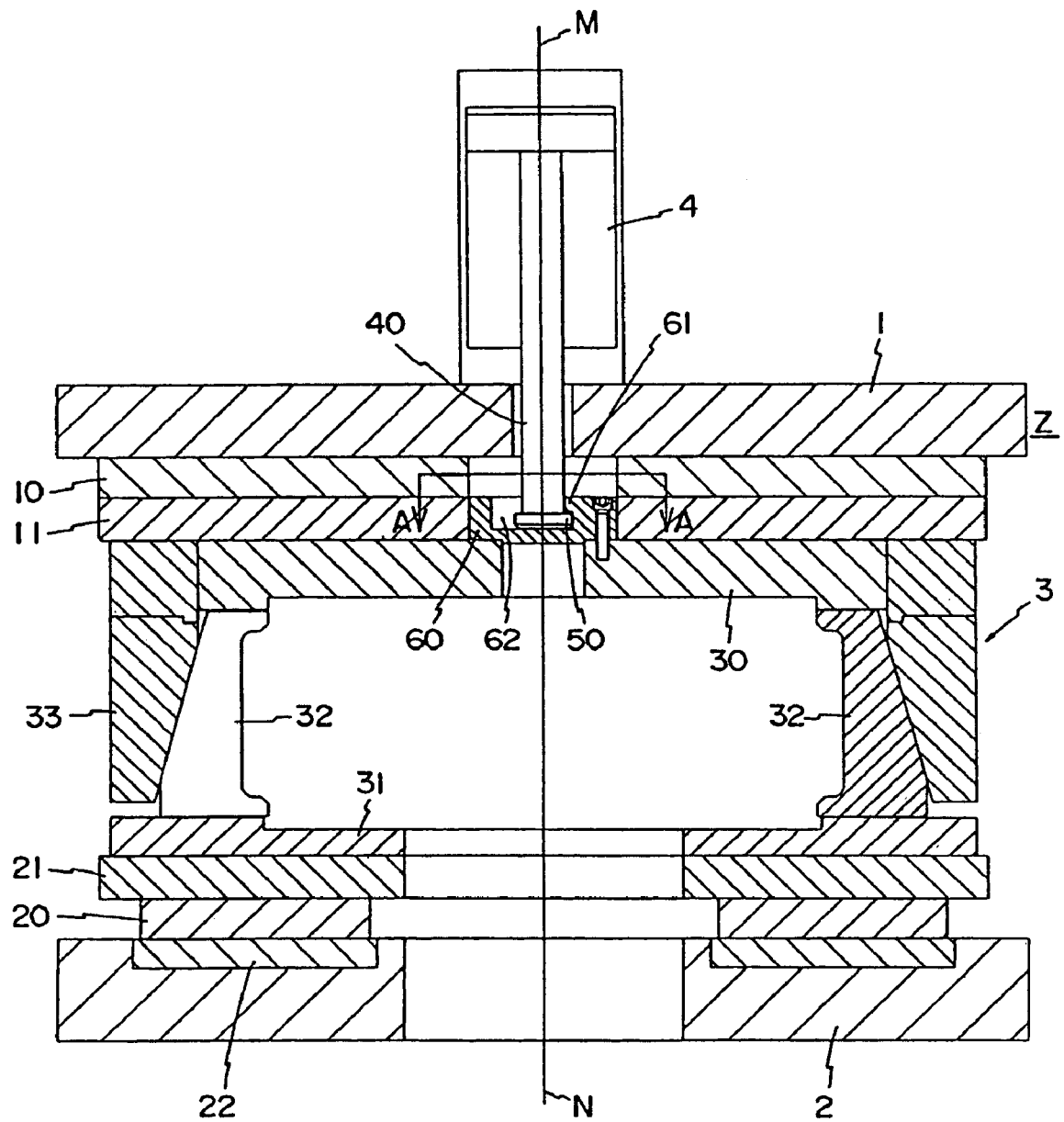
FIG. 1 is a schematic sectional view showing an embodiment of a mold attaching/detaching apparatus in a tire vulcanizer.
Figure 2:
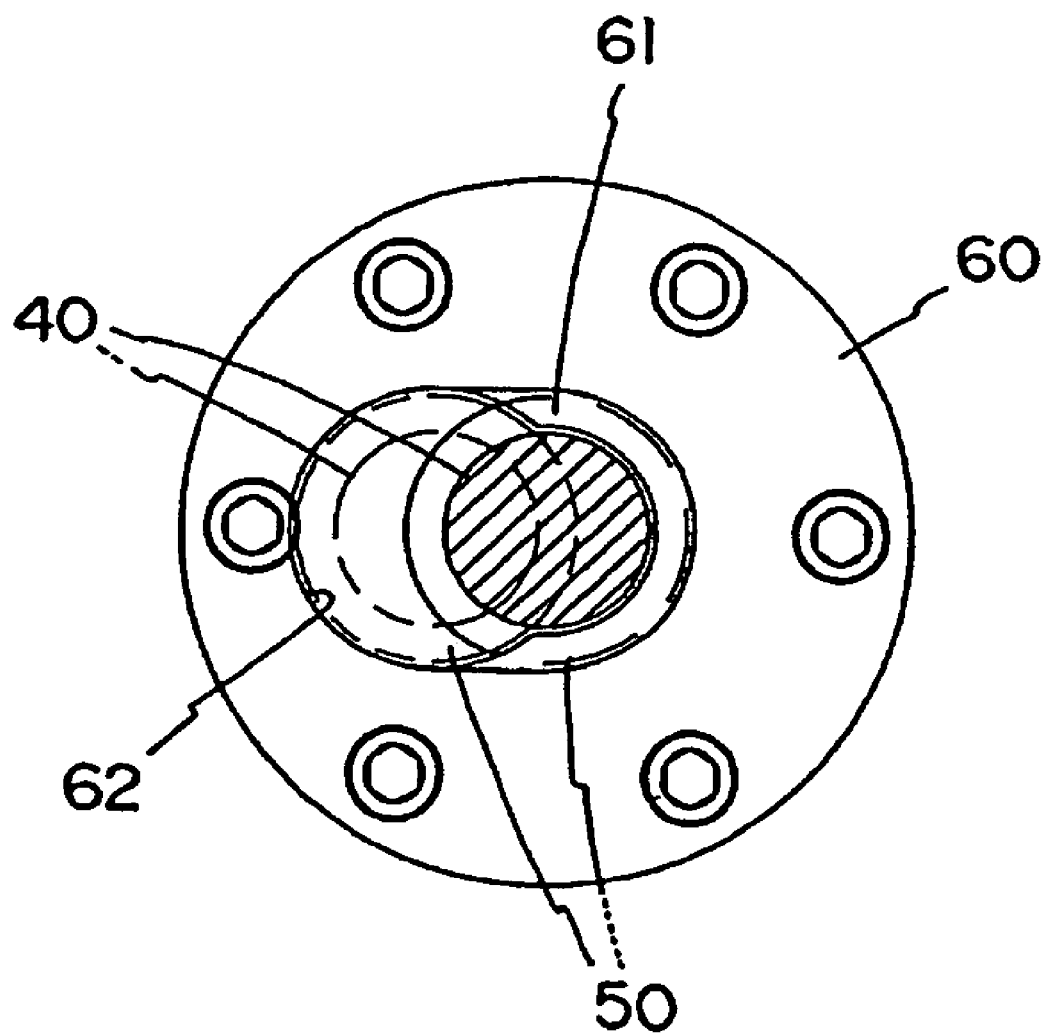
FIG. 2 is a sectional view taken along a line A-A in FIG. 1.

FIG. 1 is a schematic sectional view showing a mold attaching/detaching apparatus in a tire vulcanizer, according to the embodiment. FIG. 2 is a sectional view taken along a line A-A in FIG. 1. FIGS. 3 to 6 are each an explanatory view of an operation of a locking/unlocking means provided in the mold attaching/detaching apparatus.

In these figures, numeral 1 denotes a top plate, 2 denotes a bottom plate. These top plate 1 and bottom plate 2 are supported so as to relatively move in a horizontal direction, and relatively move in a vertical direction at a vulcanizing position M.

In this embodiment, the top plate 1 is mounted to a main body cylinder (not shown), and at the vulcanizing position M, vertically moves up and down between an ascent position X (the position in FIG. 3) separated from a segmental mold 3, an opening position Y (the position in FIGS. 4 and 5) for opening the segmental mold 3, and a closing position Z (the position in FIG. 6) for closing the segmental mold 3.

The bottom plate 2 is mounted on a carriage (not shown), and with the segmental mold 3 placed thereon, the bottom plate 2 laterally move between the vulcanizing position M (the position in FIGS. 5 and 6); an offset position N (the position in FIGS. 3 and 4), which is horizontally shifted by a small distance L from the vulcanizing position M so as to be located immediately in front of the vulcanizing position M; and a mold replacement position (not shown).

On the undersurface of the top plate 1, an upper platen 11 is provided, with an upper heat insulating plate 10 therebetween. On the top surface of the bottom surface 2, a lower platen 21 is provided, with a lower heat insulating plate 20 therebetween, and has an annular pressurizing cylinder 22 incorporated therein.

The segmental mold 3 includes an upper container plate 30 having an upper side-wall mold (not shown) mounted on the bottom surface thereof; a lower container plate 31 having a lower side-wall mold (not shown) mounted on the top surface thereof, and a plurality of divided segments 32 having a tread mold (not shown) mounted on the inner surface thereof, and expanding and contracting in radial directions.

On the outer peripheral surface of the upper container plate 30, a container ring 33 having a tapered inner surface is fixed. The segments 32 are supported on the upper container plate 30 so as to slide with respect to the container ring 33 and upper container plate 30.

The segments 32 perform expanding/contracting operations with an expansion/contraction device 4 mounted to the top plate 1. In this embodiment, a fluid pressure cylinder (hydraulic cylinder) is used as the expansion/contraction device 4.

With a cylinder rod 40 of the expansion/contraction device 4 engaged with the upper container plate 30, the segments 32 opens and closes due to expanding/contracting operations of the cylinder rod 40 and the inner structure of the segmental mold 3 (detailed descriptions are omitted).

The segmental mold 3 needs to be replaced in accordance with the size of a tire to be produced. For this purpose, locking/unlocking means is provided between the expansion/contraction device 4 and the upper container plate 30.

The locking/unlocking means is constituted of a locking piece 50 formed at the front end of the cylinder rod 40 of the expansion/contraction device 4 so as to jut out outward along the circumference, and a receiving piece 61 formed in a receiving block 60 mounted to the upper container plate 30.

The receiving block 60 has a long slotted hole 62 formed in the moving direction of the bottom plate 2, and the receiving piece 61 is formed at the upper edge on one side of the slotted hole 62 so as to jut out inward semi-arcuately. The locking piece 50 is formed so as to be engaged with the receiving piece 61, at the vulcanizing position M, and so as to be disengaged from the receiving piece 61, at the offset position N.

Figure 3:
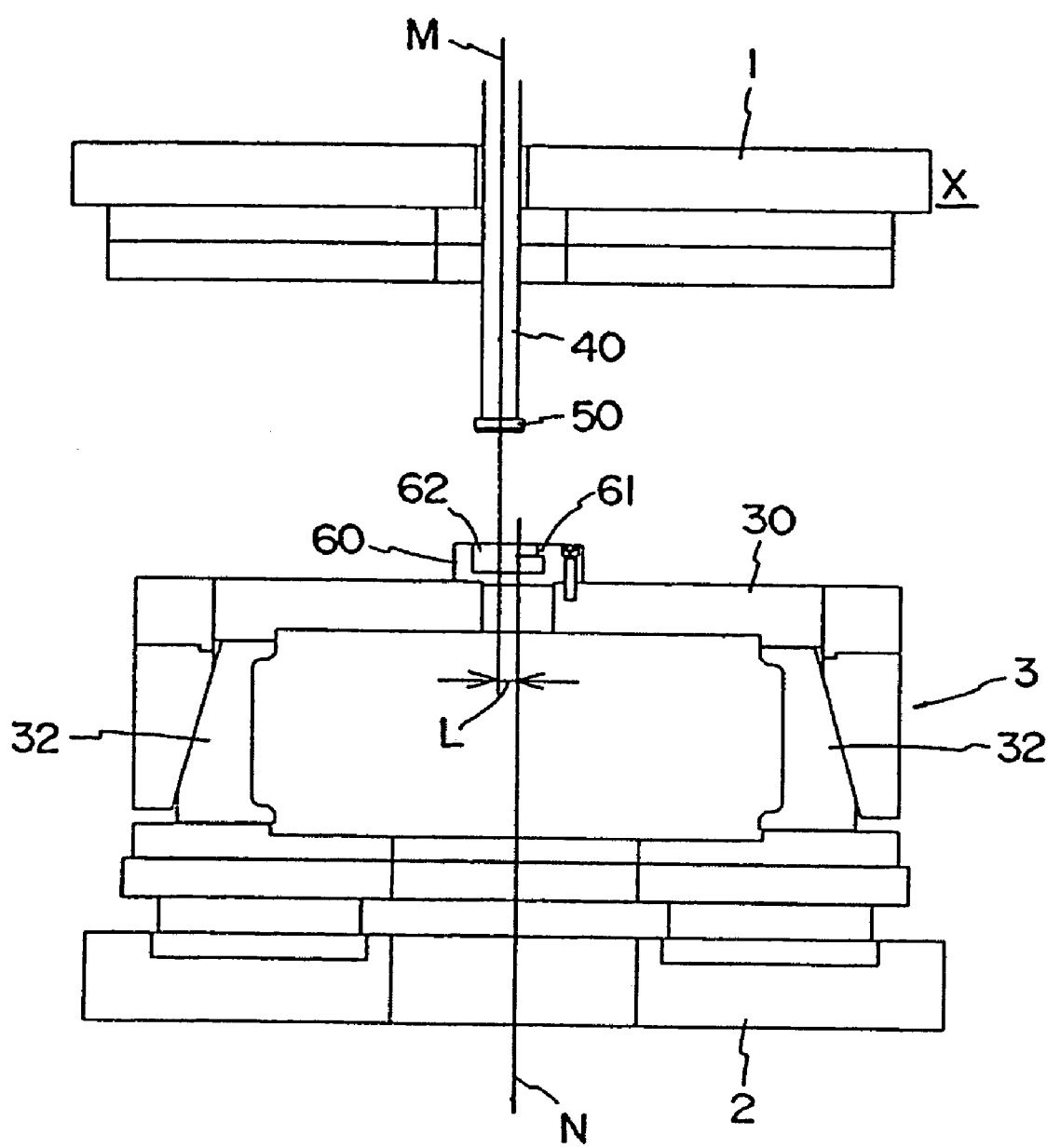
FIG. 3 is an explanatory view of an operation of a locking/unlocking means provided in the mold attaching/detaching apparatus.

Specifically, when a new replaced segmental mold 3 is connected to the tire vulcanizer, in a state where the top plate 1 is located at the ascent position as shown in FIG. 3, the bottom plate 2 on which the segmental mold 3 is placed moves from the mold replacement position to the offset position N.

Figure 4:
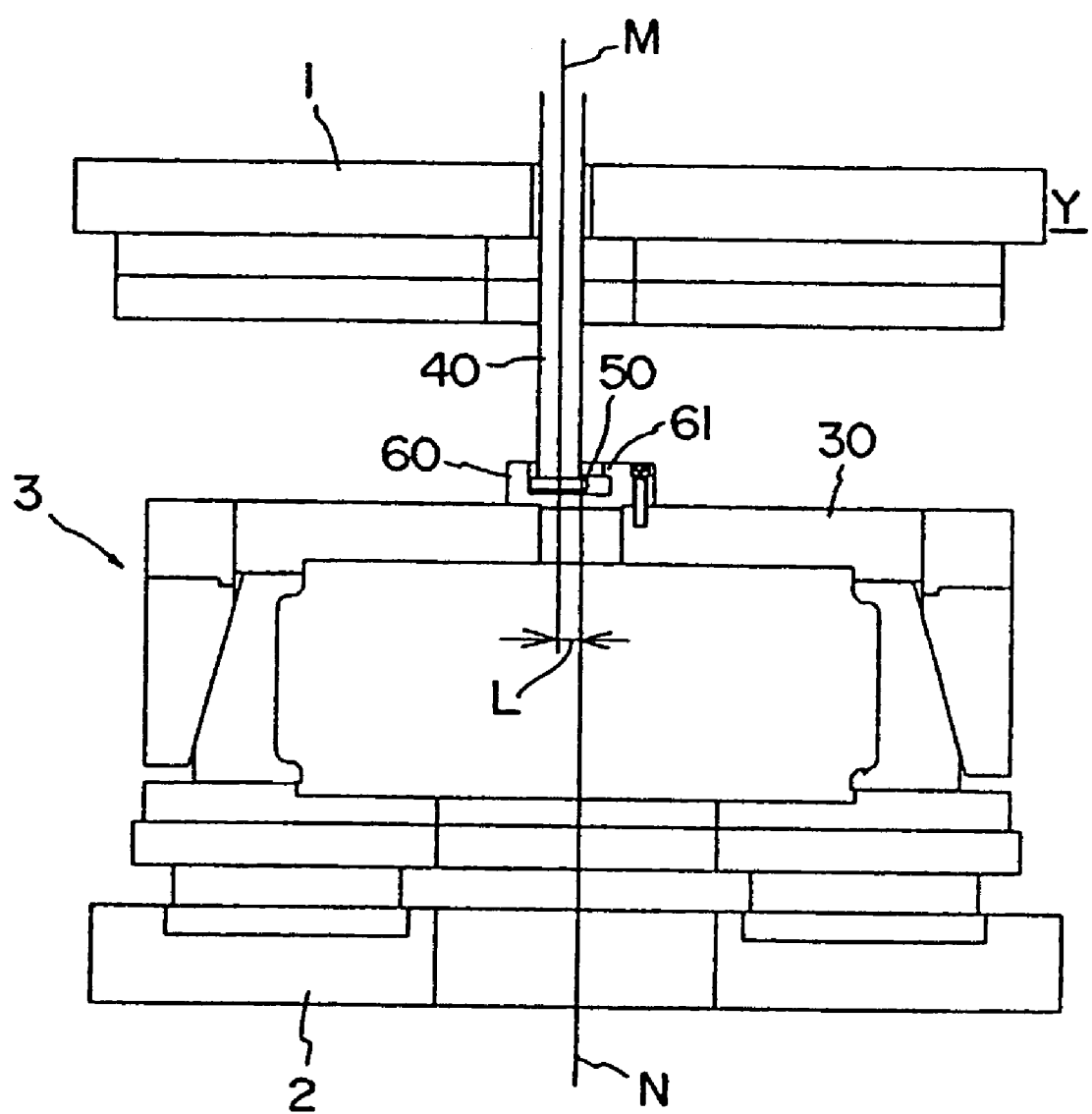
FIG. 4 is an explanatory view of an operation of the locking/unlocking means provided in the mold attaching/detaching apparatus.

Next, as shown in FIG. 4, the top plate 1 moves down to the opening position Y together with the liquid pressure cylinder serving as the expansion/contraction device 4. At this time, the front end of the cylinder rod 40 is inserted into the slotted hole 62 of the receiving block 60. In this state, however, the locking piece 50 and receiving piece 61, which serve as the locking/unlocking means, are not yet engaged with each other.

Figure 5:
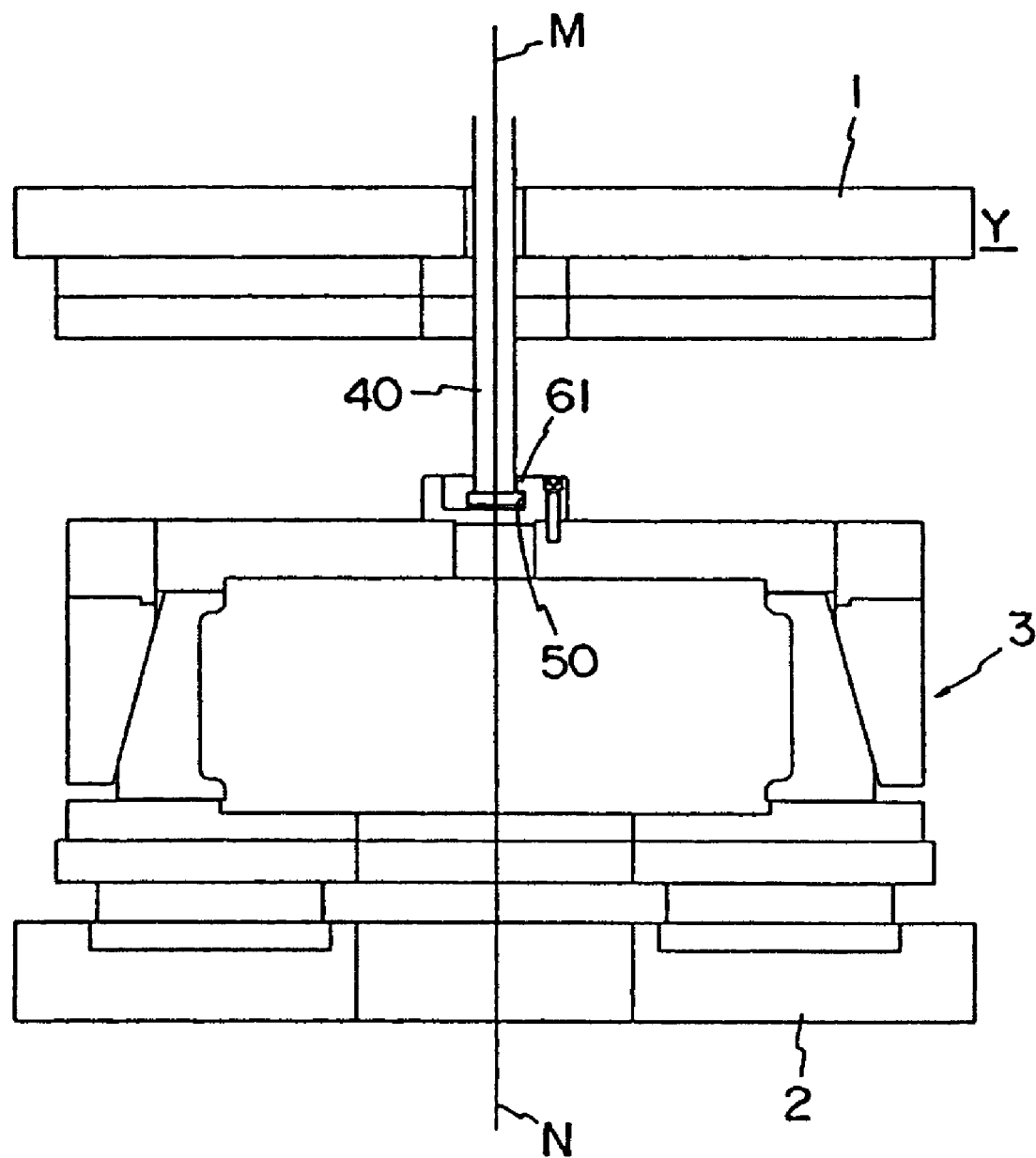
FIG. 5 is an explanatory view of an operation of the locking/unlocking means provided in the mold attaching/detaching apparatus.

Then, as shown in FIG. 5, the segmental mold 3 placed on the bottom plate 2 moves from the offset position N to the vulcanizing position M, and thereby the center of the expansion/contraction device 4 mounted to the top plate 1 and the center of the segment mold 3 placed on the bottom plate 2 coincide with each other at the vulcanizing position M. By this movement, in the slotted hole 62, the locking piece 50 horizontally moves to below the receiving piece 61 and is engaged with the receiving piece 61.

Herein, the locking/unlocking means is formed so that a slight gap occurs between the locking piece 50 and receiving piece 61 in a mutual engaged state.

Even though there occurs a gap between the locking piece 50 and receiving piece 61 in this way, it does not interfere with operations of the expansion/contraction device 4. The provision of this gap enables the locking piece 50 to smoothly perform a horizontal movement between the offset position N and vulcanizing position M.

Figure 6:
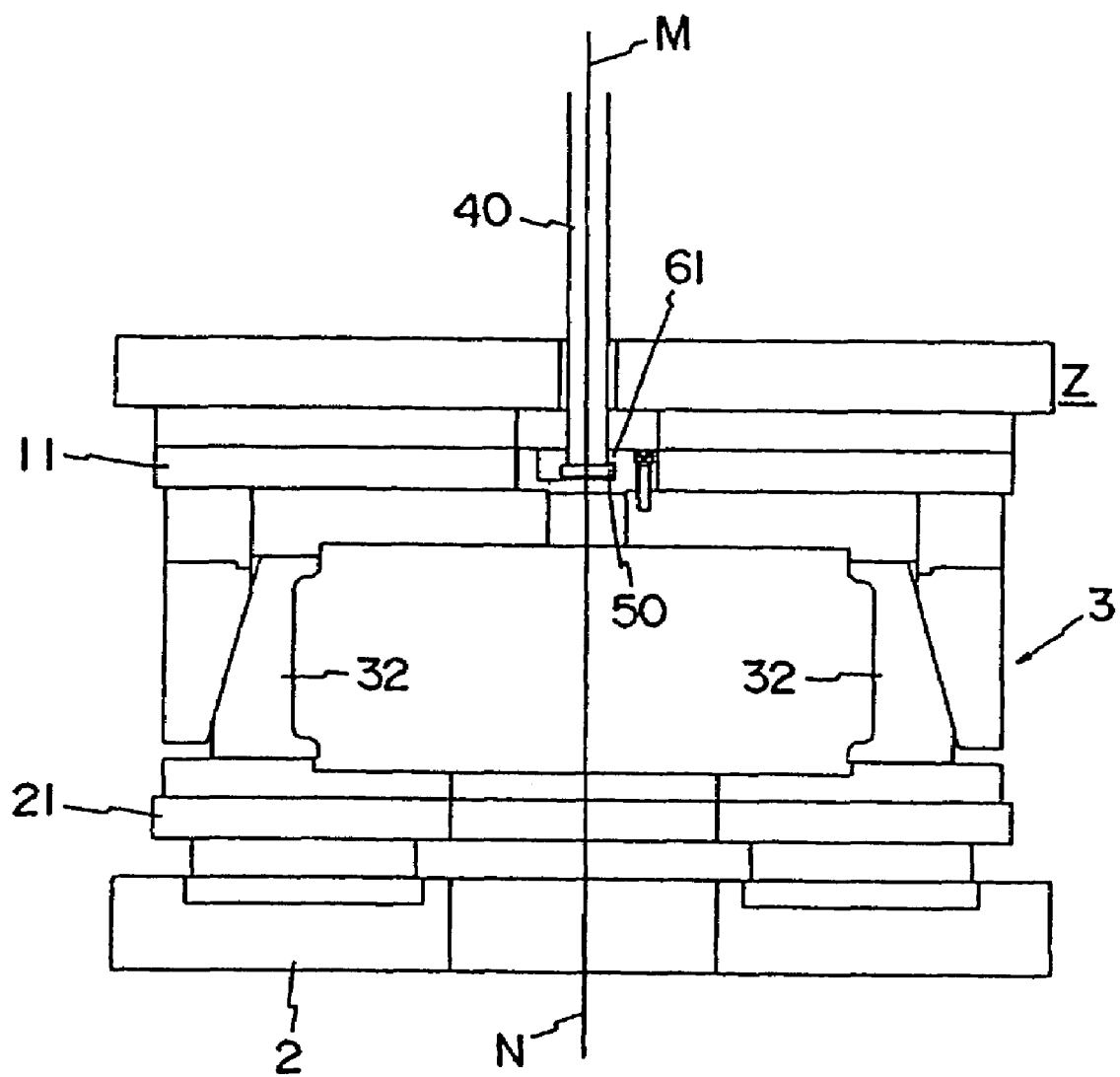
FIG. 6 is an explanatory view of an operation of the locking/unlocking means provided in the mold attaching/detaching apparatus.

After the liquid pressure cylinder serving as the expansion/contraction device 4 and the upper container plate 30 of the segmental mold 3 have been connected with each other in this manner, as shown in FIG. 6, the top plate 1 is lowered to the closing position Z, and the top plate 1 and upper container plate 30 are connected with fastening means such as bolts, thus completing connecting work for the mold.

When replacing the mold, in order to release the connection between the segmental mold 3 and tire vulcanizer, the reverse operations (FIG. 6 → FIG. 3) of the foregoing is to be performed.

The vulcanization of a tire is performed in a state where, at the vulcanizing position M, the top plate 1 connected with the upper container plate 30 moves down from the opening position Y to the closing position Z, and the segmental mold 3 is held between the top plate 1 and bottom plate 2. In this situation, inside the segmental mold 3, there is provided a bladder (not shown) expanding and contracting under the supply/discharge of a heating fluid, and the bladder expanded by the supply of the heated fluid is pressed against the inner surface of a raw tire set inside the segmental mold 3, and heating is performed by the upper platen 11 and lower platen 21, whereby the vulcanization molding is performed.

The insertion/withdrawal of the tire in/from the segmental mold 3 is performed by opening and closing the segmental mold 3 while expanding and contracting the segment 32, by raising and lowering the top plate 1 between the opening position Y and closing position Z, as well as expanding and contracting the expansion/contraction device 4, in a mutual engaged state between the locking piece 50 and receiving piece 61, which serve as the locking/unlocking means.

In the present invention, it is essential only that the top plate and bottom plate can relatively move in the horizontal direction and that they can relatively move in the vertical direction at the vulcanizing position. Hence, contrary to the above-described embodiment, the top plate may be caused to move in the horizontal direction, and the bottom plate may be caused to move up and down.

As the expansion/contraction device, a fluid pressure cylinder or motor-operated cylinder is usually employed. However, the expansion/contraction device is not limited to such a cylinder, but may include any one performing an expanding/contracting operation.

Also, the engaging means is not limited to a locking piece and receiving piece as in the embodiment, but may include any ones that are configured so as to be engaged with each other in a state where the top plate and bottom plate coincide with each other at the vulcanizing position, and so as to be disengaged from each other at the offset position where the top plate or bottom plate is shifted from the vulcanizing position in the horizontal direction.

INDUSTRIAL APPLICABILITY

As described above, the mold attaching/detaching apparatus in a tire vulcanizer, according to the present invention has locking/unlocking means that performs engagement and disengagement utilizing the relative movement between the top plate and bottom plate of the tire vulcanizer. Therefore, there is no need to incorporate a rotational mechanism into the expanding/contracting device, unlike the conventional locking/unlocking means using a bayonet mechanism. This simplifies the structure and operation of the locking/unlocking means, and produces an effect of allowing an inexpensive construction.

The invention claimed is:

1. A mold attaching/detaching apparatus in a tire vulcanizer, the tire vulcanizer comprising:
    a top plate and a bottom plate relatively moving in a horizontal direction, and relatively moving in a vertical direction at a vulcanizing position;
    a segmental mold that includes an upper container plate, a lower container plate, and a plurality of divided segments expanding and contracting in radial directions, and that is replaceably placed on the bottom plate;
    an expansion/contraction device mounted to the top plate, and expanding and contracting the segments of the segmental mold;
    a locking/unlocking means provided between the expansion/contraction device and the upper container plate; and
    the segmental mold being held between the top plate and the bottom plate to perform vulcanization at the vulcanizing position, and opened and closed while expanding and contracting the segments by raising and lowering the top plate and operating the expansion/contraction device, in an engaged state of the locking/unlocking means,
    wherein the locking/unlocking means includes a locking piece provided in the expansion/contraction device, and a receiving piece provided to the upper container plate of the segmental mold; and
    wherein the locking/unlocking means is configured so that the locking piece horizontally moves to below the receiving piece and is engaged with the receiving piece when the expansion/contraction device mounted to the top plate and the segmental mold placed on the bottom plate move to the vulcanizing position where the center of the expansion/contraction device and the center of the segmental mold coincide with each other by a relative movement between the expansion/contraction device mounted to the top plate and the segmental mold placed on the bottom plate in the horizontal direction, and so that the locking piece horizontally moves from below the receiving piece and is disengaged from the receiving piece when the expansion/contraction device or the segmental mold moves to an offset position shifted from the vulcanizing position in the horizontal direction.

* * * * *